United States Patent [19]

McIntyre et al.

[11] 4,085,303

[45] Apr. 18, 1978

[54] SAFETY DOUBLE PROTECTION DEVICE FOR MACHINES HAVING PLURAL CIRCUIT BREAKER ASSEMBLIES ASSOCIATED WITH DOFFER ROLLER AND HAND GUARD

[75] Inventors: Robert Alfred McIntyre, Bell, Calif.; Kenneth Harlan Wolverton, Arlington, Tex.

[73] Assignee: Ametek, Inc., New York, N.Y.

[21] Appl. No.: 664,690

[22] Filed: Mar. 8, 1976

[51] Int. Cl.² ............................................. H01H 3/16
[52] U.S. Cl. .................................. 200/61.41; 192/130
[58] Field of Search .......... 200/61.41, 61.42, 61.58 R, 200/52 R, 47, 153 T; 38/1 C, 44, 68; 192/129 R, 129 A, 129 B, 130, 131, 133, 135

[56] References Cited

U.S. PATENT DOCUMENTS

| | | | |
|---|---|---|---|
| 3,780,242 | 12/1973 | Bendror | 200/61.41 |
| 3,949,661 | 4/1976 | Greider | 192/130 X |

*Primary Examiner*—James R. Scott
*Attorney, Agent, or Firm*—Whann & McManigal

[57] ABSTRACT

A protection device for use on machines which are hand-fed, for protecting the machine operator from accidentally and inadvertently moving his hands inwardly into the entrance opening of the machine for precluding the possibility of injury to the hands or arms. The device provides a plurality of safety devices connected to an electric circuit which feeds the operating motor and the operation of any one of these safety features will stop the machine.

3 Claims, 5 Drawing Figures

SAFETY DOUBLE PROTECTION DEVICE FOR MACHINES HAVING PLURAL CIRCUIT BREAKER ASSEMBLIES ASSOCIATED WITH DOFFER ROLLER AND HAND GUARD

BACKGROUND OF THE INVENTION

1. Field of the Invention

In the ironing machine industry machines are provided for ironing laundry which is fed into the machine by an operator. Our invention will be described in connection with such a machine. It is to be understood, however, that our invention is applicable to various types of machines in which safety guards are necessary and desirable.

In the ironing machine industry there is usually a feed apron having a series of endless belts. The operator places the piece of laundry, for example, a bed sheet, on the feed apron, flattens it out, and then feeds it forwardly into the entrance or entrance opening of the ironing machine. Many accidents have occurred to the hands because the operator inadvertently or carelessly moves the hands forwardly into a danger position and into the machine, thus causing serious injury.

SUMMARY OF THE INVENTION

It is an object of our invention to provide a safety device in which there are a plurality of machine stopping devices or instruments arranged adjacent to the entrance opening so that if one safety device fails another safety device will take over and stop the machine, and will obstruct the passage of the hands into the machine.

In the preferred form of our invention there are three safety devices spaced different distances from the entrance opening so that if the first device becomes inoperative the second or the third device will stop the machine. The device is designed to provide a space beneath it too small to allow passage of the hand.

BRIEF DESCRIPTION OF THE DRAWING

Referring to the drawings in which we have for illustrative purpose shown our invention in connection with an ironer.

DESCRIPTION OF THE PREFERRED EMBODIMENTS

Figure 1:
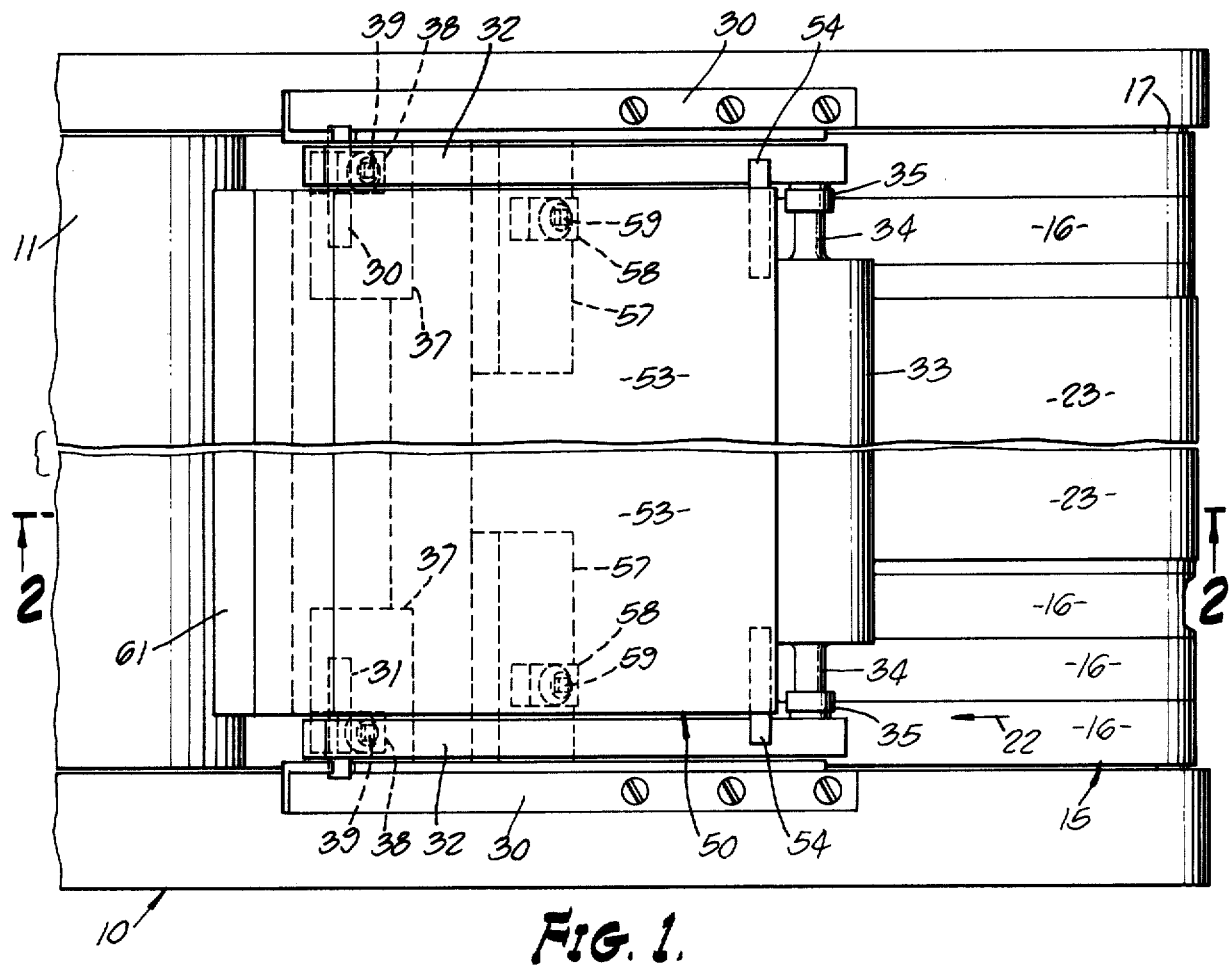
FIG. 1 is a plan view of the entrance portion and feed apron of an ironer to which our invention has been applied.

In the ironer shown in the drawings there is a main frame 10 and at least one large roll 11 and an associated steam chest 12, the sheet to be ironed being fed between the roller 11 and steam chest 12 by moving the sheet forwardly into the entrance opening 14. The ironer has a feed apron designated in general by the numeral 15. The feed apron consists of a series of endless belts 16 extending around small wheels or rollers 17, one of such rollers being powered by a motor 18 which is energized by starter 18a, schematically shown in FIG. 5, this being the same motor that operates the roll 11 in the direction of the arrow 19. The said apron also has a support platform 20 over which the upper portions of the belts move in the direction of the arrows 22. When the machine is in operation the end portion of the sheet 23 is spread substantially flat on the belts and is moved forwardly toward the entrance opening, the hands of the operator being used to guide the sheet forwardly into the entrance opening 14.

Our invention provides side plates 30 at opposite sides of the ironer and these side plates have support rods 31 which extend inwardly a short distance as shown. Pivotally supported by the support rods 31 are doffer arms 32 which extend diagonally downwardly to the right and carry a doffer roll 33. This doffer roll 33 is a rotatable roller having trunnions 34 supported by bearings 35 carried at the right ends of the arms 32. In its normal position the doffer roll 33 rests on the belts 16, or when the sheet is fed between the belts and the doffer roll the doffer roll holds the sheet substantially smooth against the belts. Supported by the side plates 30 is a fixed guard in the form of a tube 35. This fixed guard 35 is positioned parallel and adjacent to the entrance opening and its lower portion is relatively close to the upper portion of each belt 16, the distance being such that the operator's fingers cannot move between the belt and the fixed guard.

Figure 3:
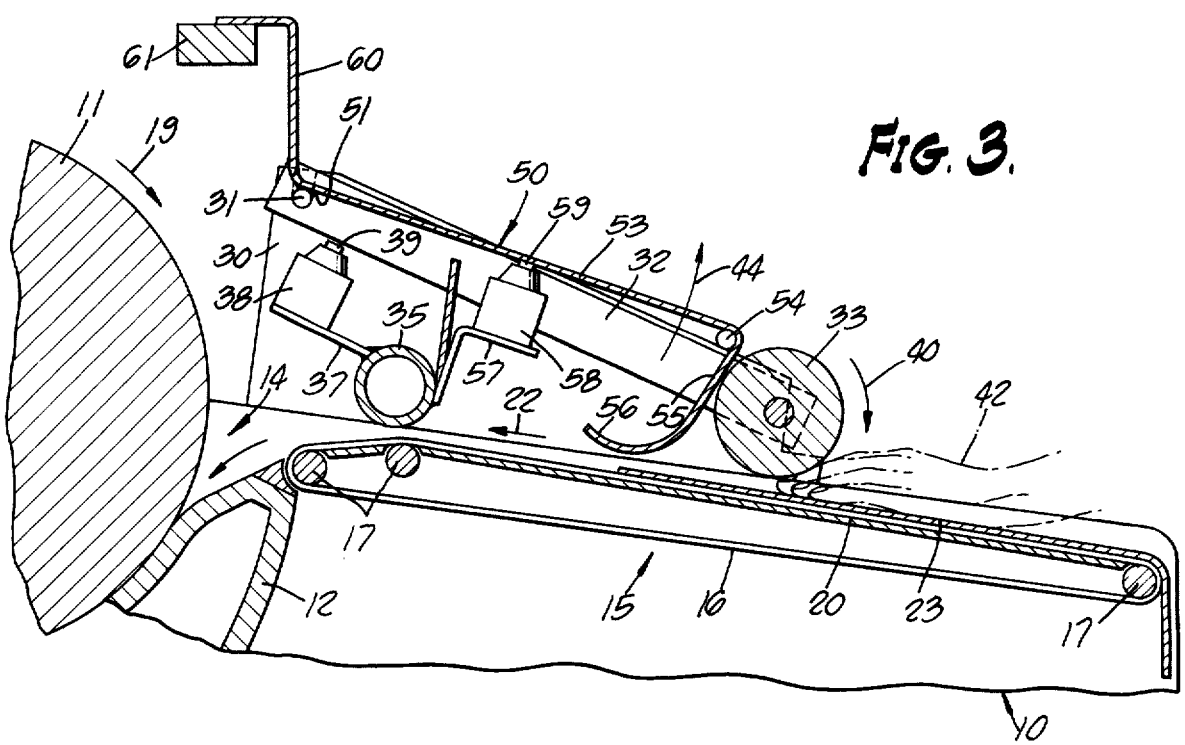
FIG. 3 is a view similar to FIG. 2 but showing the hands of the operator moved forward to move the first safety device into a motor stopping position.
Figure 5:
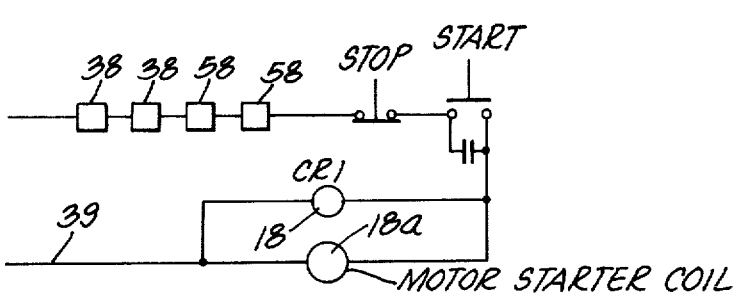
FIG. 5 is a schematic view showing the electric circuit which operates the motor of the ironer.

Attached to the fixed guard is a shelf 37 which supports a switch 38 with an actuating button 39 positioned so that the button 39 is engaged by the lower edge of the doffer arm and holds the switch closed. There are two switches 38, one positioned below each doffer arm. The switches 38, as shown in FIG. 5, are in series in the circuit 39 to the motor starter coil 18a. In the operation of the structure the operator will place the forward edge of the sheet on the endless belts, smoothing the sheet out and guiding it forwardly between the endless belts 16 and the doffer roll. The doffer roll exerts a pressure against the sheet, holding it flat as it moves along the feed apron, the doffer roll rotating in the direction of the arrow 40. If the operator, through inadvertence, inattention or carelessness, moves the hand 42 forwardly, as shown in FIG. 3, fingers will engage the doffer roll, move it upwardly and swing the doffer arms in the direction of the arrow 44 into its actuated position. In this position the switch buttons 39 are disengaged, one or both of the switches 38 will be opened, and the motor will stop.

In addition to this safety device, or feature, our invention also provides a safety guard cover 50 which is welded to the support rods 31 as indicated at 51. The safety cover has a portion 53 which completely covers the safety device of our invention from the doffer roll 33 to the forward end of our safety device, which is positioned above the entrance opening 14. The right end of the portion 53 of the cover is supported by a cross rod 54 which engages the upper edges of the side plates 30 and this prevents the right portion of the cover from moving downward beyond the position shown in FIG. 2.

Figure 2:
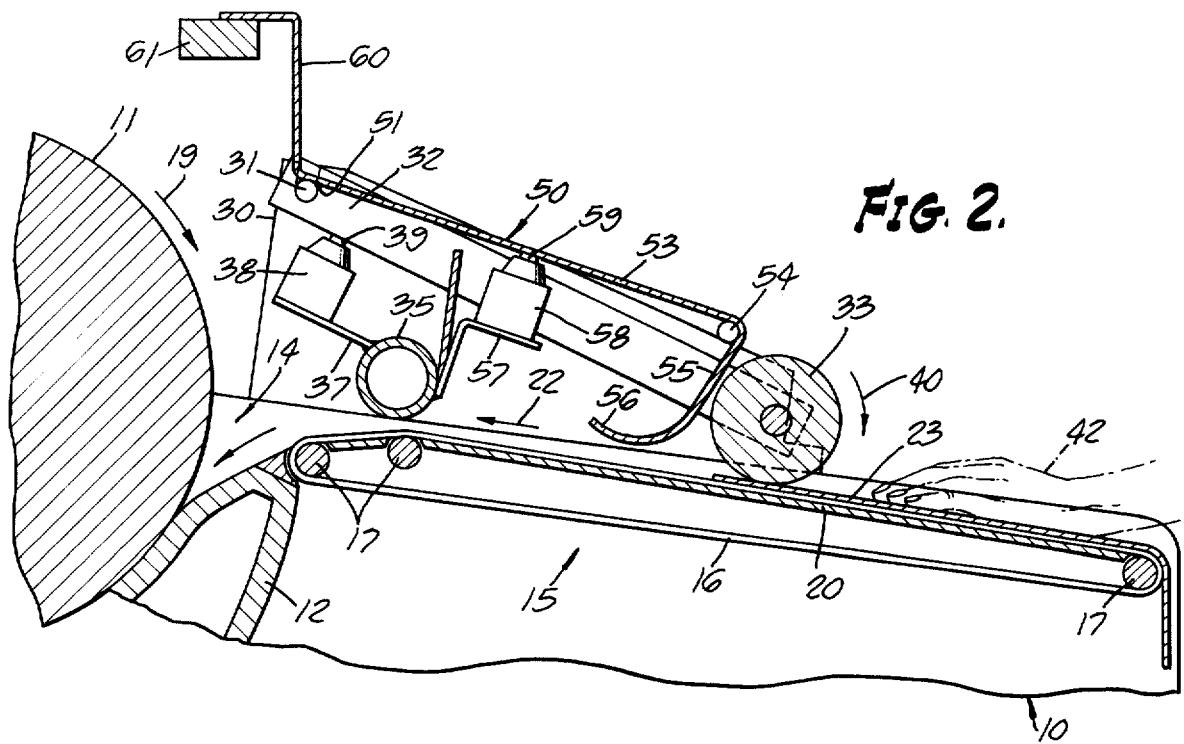
FIG. 2 is a cross-sectional view taken on the line 2—2 showing the parts of our invention in their normal position, the parts being in this position so long as the operator does not move the hands forwardly along the said apron into a dangerous position.
Figure 4:
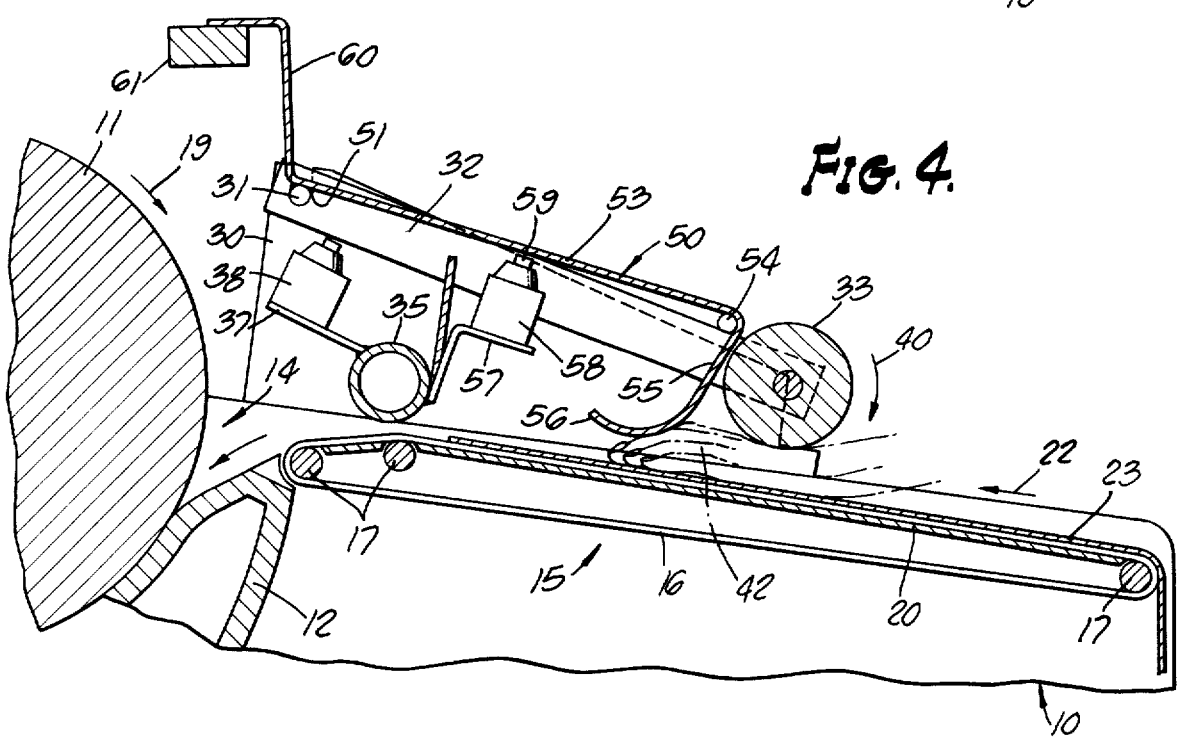
FIG. 4 is a view similar to FIGS. 2 and 3, but showing the hand of the operator moved forwardly toward the entrance opening so as to actuate the second safety device.

A portion of the cover extends downwardly at 55 and has a lower curved portion 56 which is positioned just to the left of the doffer where, as shown in FIG. 2, it is in a position so that if the operator's hands are moved forwardly or to the left beyond the position shown in FIG. 3 into the position shown in FIG. 4, the cover 50 will be moved upward. Also supported by the permanent guard tube 35 are shelves 57, each of which supports a switch 58 having an actuating button 59 which is normally engaged by the cover 50 to hold the switch closed, as shown in FIGS. 2 and 3.

There are two switches 38 which, as shown in FIG. 5, are in series with the motor starter coil 18a and the other switches 58. It will be seen in FIG. 4 that if the operator's hand moves into the position shown in FIG. 4 the cover will be rotated from its normal position around the axis of the rod support 31 and into its actuated position. The button 59 will be then disengaged, thus permitting the switches 58 to open.

The cover 50 also has a vertical extension 60 which carries a balancing weight 61 so that the cover will move with but little pressure. The function performed by the vertical portion 60 is to prevent the operator from reaching forwardly over the safety device. When the operator does this the hands will engage the vertical portion 60 and swing the cover in an anticlockwise direction, thus opening the switches 58.

Also, if the doffer roll 33 is moved high enough as in FIG. 4, the arms 32 will move the rod 54 upward, moving the cover 50 into actuated position.

As thus explained, there are two separate safety devices, each independently operable and each including two shut-off switches. It is unlikely that the first safety device, namely, the doffer roll, its arms and switches will fail. However, should something unforeseen happen, then the safety cover will be actuated and the switches 58 opened to shut down the motor. Again, it is highly unlikely that this second safety device will fail, but if it does, then there is the third safety device in the form of the fixed guard 35, which is positioned above the feed platform a close distance so that the fingers cannot move between the lower portion of the fixed guard and the moving belts. The hands being brought against this fixed guard will, of course, be caused some damage, but it will absolutely prevent the hands from moving forwardly into the entrance opening where they may be seriously crushed.

Various modifications of the herein structure may be made without departing from the spirit and scope of our invention, such, for example, as may be necessary in order to adapt our invention to fit the various machines on which it may be placed.

We claim:

1. A double protection device for use on a machine into which material is hand fed to shut off the machine when any part of an operator's hand passes into the entrance of that machine, the device comprising:

a frame having a material moving belt mounted thereon;

a doffer roll pivotally mounted on said frame to engage material being hand fed into the machine and press that material against said belt, said doffer roll and said belt defining the entrance to the machine;

a first machine shutdown mechanism for shutting off the machine, said first shutdown mechanism including a first safety switch mounted on said frame and operatively connected to said doffer roll to be actuated by pivotal movement of said doffer roll away from said belt beyond a predetermined distance, said predetermined distance corresponding to the movement undergone by said doffer roll away from said belt if an operator's fingers are caught between said doffer roll and said belt, said doffer roll thereby exerting pressure against the material being fed into the machine and actuating said first safety switch;

a second machine shutdown mechanism for shutting off the machine, said second shutdown mechanism mounted on said frame and including a safety guard cover pivotally mounted on said frame and located immediately behind said doffer roll in the direction of movement of said belt and to be thereby located closely adjacent said entrance and having a lower portion located just above said belt and a second safety switch mounted on said frame and operatively connected to said guard cover to be actuated by pivotal movement of said guard cover, said guard cover pivotal movement being caused by contact thereof with an operator's fingers, said second safety mechanism being in series with said first safety mechanism to back up said first safety mechanism and shut off the machine in the event said first safety mechanism fails to do so thereby providing a double protection system which is located at the entrance to the machine.

2. The protection device of claim 1 further including connecting means connecting said first shutdown mechanism to said second shutdown mechanism in a manner such that movement of said doffer roller beyond a predetermined distance away from said belt actuates said second safety mechanism.

3. A combination as defined in claim 1 in which said cover has a balancing portion extending from said cover is pivotally mounted whereby the weight of said cover is substantially balanced to reduce operating force and whereby engagement of said balanced portion tending to raise said engagement portion of said cover will move said cover into actuated position.

* * * * *